(12) United States Patent
Ganti et al.

(10) Patent No.: US 7,184,434 B2
(45) Date of Patent: Feb. 27, 2007

(54) LABEL DISTRIBUTION PROTOCOL SUPPORTING MULTIPLE CLASSES OF SERVICE IN A MULTI PROTOCOL LABEL SWITCHING (MPLS) NETWORK, METHODS AND MPLS NETWORK USING THEREOF

(75) Inventors: Sudhakar Ganti, Ottawa (CA); Nabil Seddigh, Ottawa (CA); Biswayjit Nandy, Ottawa (CA)

(73) Assignee: Tropic Networks Inc., Kanata (CA)

( * ) Notice: Subject to any disclaimer, the term of this patent is extended or adjusted under 35 U.S.C. 154(b) by 1052 days.

(21) Appl. No.: 10/107,333

(22) Filed: Mar. 28, 2002

(65) Prior Publication Data

US 2003/0185217 A1    Oct. 2, 2003

(51) Int. Cl.
    *H04L 12/56* (2006.01)
(52) U.S. Cl. ..................................................... 370/389
(58) Field of Classification Search ............. 370/395.1, 370/397; 709/223, 225
    See application file for complete search history.

(56) References Cited

U.S. PATENT DOCUMENTS

| 6,968,374 | B2 * | 11/2005 | Lemieux et al. ............ 709/223 |
| 2005/0180431 | A1 * | 8/2005 | Kinoshita et al. ........... 370/397 |
| 2006/0089988 | A1 * | 4/2006 | Davie et al. ................ 709/225 |

OTHER PUBLICATIONS

Braden, R. (ed) . , ietf RFC 2205—Resource ReSerVation Protocol (RSVP) , Sep. 1997.

Wroclawski, J. , ietf RFC 2210—"The Use of RSVP with IETF Integrated Services", Sep. 1997.
Blake, S. , et al, ietf RFC 2475—"An Architecture for Differentiated Services", Dec. 1998.
Rosen, E. , et al, ietf RFC 3032—"MPLS Label Stack Encoding", Jan. 2001.
Awduche, D. , et al, ietf RFC 2702—"Requirements for Traffic Engineering Over MPLS", Sep. 1999.
Awduche, D. , et al, ietf RFC 3209—"RSVP-TE: Extensions to RSVP for LSP Tunnels", Dec. 2001.
Le Faucheur, F. , et al, ietf Internet Draft, (draft-ietf-mpls-diff-ext-09.txt), MPLS Support of Differentiated Services, Apr. 2001.
Le Faucheur, F. (ed) . , et al, ietf Internet Draft, (draft-ietf-tewg-diff-te-reqts-03-txt) , "Requirements for Support of Diff-Serv-aware MPLS Traffic Engineering", Feb. 2002.
Le Faucheur, F. (ed) . , et al, ietf Internet Draft, (draft-lefaucheur-diff-te-proto-01.txt), "Protocol Extensions for Support of Diff-Serv-aware MPLS Traffic Engineering", Nov. 2001.
Jamoussi, B. (ed.) , et al, ietf RFC 3212—"Constraint-Based LSP Setup using LDP", Jan. 2002.
Andersson, L. , et al, ietf RFC 3036—"LDP Specification", Jan. 2001.
Katz, D. , et al, ietf Internet Draft, "Traffic Engineering Extensions to OSPF", (draft-katz-yeung-ospf-traffic-06.txt) , Expiration date Apr. 2002.

(Continued)

*Primary Examiner*—Hassan Kizou
*Assistant Examiner*—Albert T. Chou
(74) *Attorney, Agent, or Firm*—Victoria Donnelly

(57) ABSTRACT

A multi-protocol label switching (MPLS) packet network, methods and traffic engineering extensions to label distribution protocol are provided, capable of carrying traffic of multiple classes of service over the same label switch path.

12 Claims, 7 Drawing Sheets

OTHER PUBLICATIONS

Bitar, N., et al, ietf Internet Draft, "Traffic Engineering Extensions to OSPF", (draft bitar-rao-ospf-diffserv-mpls-01.txt, Expiration date Dec. 2001.

Giroux, N., et al. "Quality of Service in ATM Networks", Prentice Hall, Inc., Upper Saddle River, NJ, 07458, U.S.A., 1998, Chapter IV, Connection Admission Control.

* cited by examiner

LABEL DISTRIBUTION PROTOCOL SUPPORTING MULTIPLE CLASSES OF SERVICE IN A MULTI PROTOCOL LABEL SWITCHING (MPLS) NETWORK, METHODS AND MPLS NETWORK USING THEREOF

FIELD OF THE INVENTION

The invention relates to Multi Protocol Label Switching (MPLS) packet networks, and in particular to a label distribution protocol to support multiple classes of service in a Multi Protocol Label Switching (MPLS) network, and MPLS network and methods using this protocol.

BACKGROUND OF THE INVENTION

Connectionless packet networks using the Internet Protocol (IP) are well established. Connection oriented Multiprotocol Label Switching (MPLS) packet networks have been developed for IP packet networks, using Label Switched Routers (LSRs) instead of IP routers for traffic engineering.

FIG. 1 illustrates the concept of an MPLS packet network 10 according to the prior art. Though the concept is illustrated with IP network connectivity, the application is not limited to IP networks only. The MPLS packet network 10 provides connectivity between a first IP network 12 and a second IP network 14. The first IP network 12 is connected to a first Label Edge Router (LER) 16 over link 18. The second IP network 14 is connected to a second Label Edge Router 20 over link 22. Inside the MPLS packet network 10, LER 16 and LER 20 are connected to one or more Label Switched Routers (LSR) 24 over links 26 and 28 respectively. Typically, a number of LSRs are configured in the network 10 to provide the desired connectivity, the dashed line 28 indicating the possibility that there may be several LSRs in the route between LER 16 and LER 20.

A Label Switched Path (LSP) 30 is shown to extend from LER 16 to LER 20 through the LSR 24, an LSP indicating a route followed by a particular stream of packets through the MPLS packet network.

In operation, LSPs 30 between the LERs 16 and 20 of a MPLS packet network 10 are established during a signalling phase using, e.g., the RSVP-TE protocol described in Internet Engineering Task Force (ietf) document RFC 3209. By way of example, LSP 30 might be established for the purpose of providing a connection between IP network 12 and IP network 14. During the data transfer phase, IP packets originating in IP network 12 and destined for IP network 14, enter the MPLS packet network at LER 16 in the form of regular IP packets. Then the IP packets are encapsulated in MPLS packets in the LER 16 to flow through the MPLS packet network 10 following the LSP 30 that was established, and then the MPLS packets are de-capsulated back to regular IP packets in LER 20 and sent to IP network 14 over link 22.

An MPLS router (an LSR 24) forwards packets on the basis of an MPLS label, which logically defines a label switched path (LSP) through the network. Packets with different IP addresses may frequently need to be switched through the MPLS packet network over the same path. For example, all packets from the IP network 12 to the IP network 14 in FIG. 1 may follow the same path even though they originate from different computers in IP network 12 and are destined for a number of different computers in the IP network 14.

The efficiency of the MPLS packet network 10 derives from the fact that the individual LSRs 24 along the path only need to inspect the MPLS label of each packet to route it, instead of decoding the IP address.

Accordingly, the MPLS packet network 10 is said to be connection oriented, because for each packet stream to traverse the network, a connection, that is a label switched path, must exist and have been set up by a connection establishing protocol.

In FIG. 2 is illustrated a MPLS packet network providing two distinct LSPs to carry different classes of traffic, according to the prior art. FIG. 2 is a more detailed view of the network shown in FIG. 1.

In addition to the first LSR 24, the MPLS packet network 10 contains exemplary second and third LSRs (reference numbers 40 and 42 respectively).

Two connections are shown, linking computers in the first and second IP networks, and representing two classes of service (COS1 and COS2). A first connection 44, shown in a dotted line, extends from a computer 46 in the first IP network 12 to a computer 48 in the second IP network 14. The connection 44 comprises segments from the computer 46 to the first LER 16 over link 18; from the LER 16 over link 26 to the first LSR 24; from the LSR 24 to the second LER 20 over link 28; and finally from the LER 20 to the computer 48 over link 22.

The path, represented by connection 44, is taken by COS1 packets sent from computer 46 to the computer 48. It contains IP segments on links 18 and 22 at the edge of the MPLS packet network, and a MPLS label switched path (LSP) 50 which extends from the first LER 16 to the second LER 20 within the MPLS packet network.

A second connection 52, shown in a heavy solid line, extends from a computer 54 in the first IP network 12 to a computer 56 in the second IP network 14. The connection 52 is similar to connection 44 but uses a different label switched path (LSP) 58 within the MPLS packet network, and carries COS2 packets.

Different IP networks may be owned or operated by different organisations, such as ISPs (Internet Service Providers), or may be components of private networks. MPLS packet networks, on the other hand, may be owned or operated by yet other organisations. As such, MPLS packet networks provide the capability to establish paths between specific IP or other Layer 2 networks at their edges, including the ability to connect several geographically distributed parts of a private network together.

Another concern with packet networks is the Quality of Service (QoS), including delay, bandwidth availability, and packet loss.

The current service model in the Internet is Best-Effort. In this framework, packets are routed using a shortest path algorithm, and there is no differentiation accorded to user packets in the router Forwarding Plane (FP). The emergence of the Internet as an inter-communication network with global reach has led to renewed efforts to develop service models that can guarantee or assure a certain quality of service for end users.

The technologies for addressing QoS in packet networks differ depending on the packet protocol of interest at the present time is primarily the provision of differentiated QoS in both IP and MPLS packet networks.

Traffic Engineering (TE), see e.g., Awduche et al, "Requirements for Traffic Engineering Over MPLS", ietf RFC 2702, September 1999, is one of the key elements in the tool-kit to deliver some level of guaranteed service (in the form of Service Level Agreements) to the end-users.

Initial TE solutions used MPLS to steer best-effort traffic away from shortest-path congested links. Such an approach improves network utilization and enhances performance for best-effort traffic.

Recent initiatives have resulted in the development of the Diffserv (Differentiated Services) architecture, see Blake S. Et al, "An Architecture for Differentiated Services", ietf RFC 2475, December 1998, as a means of providing multiple classes of traffic for IP networks. Consequently, there is a desire to extend the current TE mechanisms to MPLS networks to carry multiple classes of traffic. This approach is referred to as DS-TE (Differentiated Services Traffic Engineering).

The currently accepted DS-TE approach allows an MPLS packet network to support multiple classes of traffic, but it has a number of limitations. First, it requires that each MPLS path carry only a single class of traffic (COS). Secondly, the scheme requires manual configuration of additional mapping information at each node in the network. Finally, the scheme imposes undesirable restrictions on the pre-emption relationship amongst various classes-of-service. Pre-emption comes into play when LSPs are setup. An LSP with high set-up priority can supersede a low holding priority connection due to lack of resources. Pre-emption priority is unrelated to the class of service and as such should be treated separately. The solutions discussed in the traffic engineering workgroup (TE-WG) of IETF explicitly state that there is no value in supporting a DS-TE solution that enables multiple classes of traffic to be carried over a single LSP. The current DS-TE solutions assume that the service provider use either L-LSP or E-LSP that carries only a single class of traffic. With Label-only-Inferred-LSPs (L-LSP), the CoS is explicitly signalled at label establishment time so that after the label establishment, the LSR can infer exclusively from the label value the CoS to be applied to a labeled packet. In case of EXP-inferred-LSPs (E-LSP), the CoS of a packet transported on this LSP depends on the EXP field value for that packet.

We will now briefly describe the six key elements, which are required to support a Differentiated Services Traffic Engineered IP network, based on the current approach to DS-TE for a single class of service (COS) as defined in the ietf draft to Le Faucheur et al, cited above. 1. The IGP (Interior Gateway Protocol) routing protocol (e.g Open Shortest Path First, OSPF) advertises per-link, per-preemption-priority allocated bandwidth. There are eight priority levels specified. These levels are historically intended to correspond to pre-emption priority levels of MPLS LSPs. Thus, each OSPF advertisement would flood unreserved bandwidth for each of the 8 priority levels of an interface. The protocol extensions for this method can be found in ietf draft by Katz et al, "Traffic Engineering Extensions to OSPF", Internet draft<draft-katz-yeung-ospf-traffic-06.txt>, October 2001.

2. At the network edge, the routing device derives the network topology based on received IGP advertisements. When the device receives a request to setup a constraint based LSP to a particular network egress device, it runs a path computation algorithm to find a path that satisfies the necessary constraint. In this case, the path computation algorithm finds a path that can satisfy the bandwidth requirement for a single class of service. At the node, the operator has to configure the computation algorithm to map the OSPF priority levels to a specific class of service. The output of the path computation algorithm is the explicit route (hops along the path) from network ingress to network egress.

3. The network edge device (the LER) then requests an LSP to be setup from itself to the network egress along the explicit route determined in the previous step. The signaling protocol used may be either RSVP-TE described in ietf draft RFC 3209 or CR-LDP described in IETF draft RFC 3212. The current RSVP-TE specification has no way of explicitly specifying the class of traffic for an LSP. Traffic parameters for only a single class of traffic can be signaled as part of the LSP setup.

4. At each node along the explicit path from ingress to egress, Connection Admission Control (CAC) is executed to determine whether or not a request can be admitted. The CAC algorithm maintains the equivalent of buckets for each of the priority levels to determine how much bandwidth has been used and whether or not a new request can be admitted. Periodically, as the bandwidth usage for different levels exceeds certain thresholds, CAC informs the local routing module of a node of this change so that it may advertise these values as part of new LSAs (Link State Advertisements) being sent to the rest of the routers on the network.

5. At each node, the forwarding plane queuing and buffer management parameters can also be dynamically modified based on bandwidth reservation in the control plane. In this way, instead of having to statically restrict the bandwidth used by each class of service, it can adjust automatically based on actual customer demand. This provides for a more manageable network. The forwarding plane queues and buffers are typically configured based on classes of service based on Diffserv PHBs (Per Hop Behaviour). This is done through an operator configured table that maps priority levels to Diffserv PHBs and/or classes.

6. At the network ingress device, the packet classification and policing mechanisms aggregate customer traffic based on specified traffic filters, meter, police and mark the traffic to receive treatment with a Diff-Serv PHB before mapping the traffic to traverse a pre-set LSP. The EXP (explicit) bits of the MPLS label are marked to indicate the PHB treatment for each packet. The label will guide the packet onto the LSP that was set up in previous steps.

LSP Setup

Another component in a DS-TE architecture involves the set-up of the LSP that is used to carry the traffic across the network. Two different types of LSPs can be set-up. Diffserv over MPLS (DS-MPLS), described in ietf draft by Le Faucheur F et al, "MPLS Support of Differentiated Services", Internet draft, <draft-ietf-mpls-diff-ext-09.txt>, April 2001, defines methods to setup DS-TE LSPs in an MPLS network. Two different types of LSPs can be utilized, these are commonly referred to as E-LSPs (EXP-inferred-LSPs) and L-LSPs (Label-Only-Inferred-LSPs). More details can be found in Rosen, E. et al, "MPLS Label Stack Encoding", ietf RFC 3032, January 2001 and Blake, S. et al, "An Architecture for Differentiated Services", ietf RFC 2475, December 1998.

Apart from the type of LSP utilized, there is also the signaling protocol to be considered. In an MPLS network, where the LSP path is determined at the network ingress node, either CR-LDP, see Jamoussi, B. et al, "Constraint-based LSP setup using LDP", RFC 3212, or RSVP-TE, see Awduche, D. et al, "RSVP-TE: Extensions to RSVP for LSP Tunnels", RFC 3209, may be used as signalling protocols.

There are a number of examples where the current DS-TE solution is deficient, some of them being listed below.

Voice-Over-IP

With such traffic, it is desirable for the voice data and signaling to be treated as different classes and carried through the network efficiently. The easiest way of doing this is to transport the data and signaling on different classes in a single LSP.

Virtual Private Networks

A key emerging application for E-LSPs with multiple classes is Layer 2 Virtual Private Networks (L2VPN). In this context, service providers (SP) for the Metropolitan Networks seek to provide TLAN (Transparent LAN) services. The SP may provide Layer 2 VPNs for its end customers where the key SLAs (Service Level Agreements) revolve around availability and QoS (Quality of Service). In such cases, the SLA may specify a single protection level for the aggregate while specifying multiple classes of service within the VPN. In such networks, the current DS-TE solution requires that different classes of service are sent on different LSPs which immensely complicates the ability to offer robust and measurable availability and QoS SLAs to such customers.

Path Protection

Path protection and restoration mechanisms are two key requirements in modern packet networks. The current DS-TE solution usually requires a single customer's traffic to be carried over a large number of LSPs in the network. This causes issues with ensuring that short restoration times are met due to the sheer volume of LSPs that have to be re-signaled or redialed when links go down.

Scalability

The current DS-TE solution requires a single class of traffic per LSP. Because many users will have several classes of traffic, this will cause the number of LSPs in the network to increase by a factor of at least two and in some cases, three, four or larger. The number of LSPs is a scalability concern for a number of reasons. Firstly, it is of concern in the forwarding path of the data plane. Since the data plane maintains tables with an entry for each LSP, a larger number of LSPs will mean larger LSP switching tables in the data plane. These tables typically have limits associated with them, which is especially true for high performance hardware based LSP switching. As the number of LSPs increases beyond a certain point, it will be necessary to have caching schemes to retrieve stale LSP entries from the control plane. This causes the packet delay within the device to increase. Secondly, it increases the time required for LSPs to recover in "hitless restart" situations. Finally, it is of concern for the state management of MPLS signaling protocols. For example, distributed RSVP implementations typically maintain four distinct state machines related to the PATH and RESV state blocks (PSB and RSB), as described in ietf draft RFC 2209. Each of these state machines has a list of LSPs associated information stored per LSP. Thus, the signaling time for an RSVP packet is heavily dependent on four different lookups that are performed per node. Reducing the number of LSPs will assist in reducing the LSP setup time and thus, increase the connection setup rate that a node can support.

Network Operations

Another important area of consideration is related to the area of network maintenance and administration. When trouble-shooting issues related to a customer's traffic, the current DS-TE solution frequently requires the network operator to examine multiple LSPs, carrying the different classes of traffic for the same customer.

In summary, a shortcoming of current MPLS packet networks is the limitation that connections can only be set up for one class of service. If a connection for several classes of traffic is required (between the same two end points), the choice is either to set up separate connections, one per class, or to set up a single-class connection with parameters reflecting a compromise of the several classes of traffic that will use this connections. These approaches have numerous drawbacks as has been discussed above.

SUMMARY OF THE INVENTION

It is therefore an objective of the present invention to provide an improved MPLS packet network for providing differentiated services over a single label switched path, a method for establishing and optimizing such paths and a label distribution protocol therefor.

According to one aspect of the invention there is provided a label distribution protocol for signalling between nodes in an MPLS network, comprising a message including:

a set-up message object, comprising:

a set-up message object header having a field for identifying a multi-class-of-service message object type; and a multi-class-of-service set-up message object contents, including:

a field identifying the number of classes of service in the object contents; and a traffic profile field for each class of service.

Each of the traffic profile fields comprises a traffic profile sub-field identifying a Per-Hop-Behaviour (PHB) scheduling class associated with the corresponding class of service. Beneficially, each of the traffic profile fields further comprises sub-fields, characterizing a packet stream associated with the corresponding class of service. Conveniently, the number of sub-fields, characterizing a packet stream associated with the corresponding class of service is equal to five, and the five sub-fields, characterizing the packet stream are the Token Bucket parameters used in RSVP-TE protocol as defined in section 3.1 of Internet Engineering Task Force (IETF) document #RFC 2210. Alternatively, the five sub-fields, characterizing the packet stream may be the fields used in CR-LDP protocol described in CR-LDP definitions for the Traffic Parameter fields in section 4.3 of Internet Engineering Task Force (IETF) document #RFC 3212.

Conveniently, the label distribution protocol has the sub-fields characterizing the packet stream, which are the fields described in CR-LDP definitions for the Traffic Parameter fields in Section 4.3 of Internet Engineering Task Force (IETF) document RFC 3212.

The described protocol may conveniently be used in a method for establishing a label switched path to carry traffic of more than one class of service on the same LSP in an MPLS network, the method comprising the step of exchanging messages between network nodes using the label distribution protocol. The method for establishing the label switched path may further comprise one or more of the following steps: keeping track of per-class available resources on each link and advertising them to the rest of the network, computing a path for a call request taking into account the available resources and traffic profile of the object contents of the multi-class-of-service set-up message, and providing call admission control (CAC).

Another method for packet forwarding in an MPLS network may also use the described protocol, namely, the method may comprise the steps of:

(a) in each node, associating a packet with the Per-Hop-Behaviour (PHB) scheduling class defined in the label distribution protocol for the label switched path of the packet; and (b) adjusting PHB scheduling and buffer management parameters according to a per-class resource usage as defined in step (a), e.g. tracked by CAC.

Yet another method for packet forwarding in an MPLS network may use the described protocol, namely, the method may comprise the steps of:

(a) in each edge node, associating a packet with the traffic profile defined in the label distribution protocol for the label switched path of the packet; and (b) selecting policing parameters for each class of the LSP at the edge (LER) node according to the traffic profile defined in step (a).

According to another aspect of the invention there is provided an MPLS network capable of providing multiple classes of service, comprising means for establishing a label switched path capable of providing more than one class of service and carrying traffic of the established classes of service over the same label switched path and in accordance with the label distribution protocol described above.

According to yet another aspect of the invention there is provided a network element for an MPLS network, the element being capable of exchanging messages in the network according to the described label distribution protocol, conveniently the network element being a computer means associated with a network node.

The embodiments of the invention provide the following advantages. The number of LSPs in the network is reduced as single LSP carries multiple classes of traffic from the same customer resulting in improved scalability for both control and data planes. The improved MPLS network provides faster restoration of the paths in case of failures in the network, resulting in better availability service level agreements (SLAs) and restoration times. Reduced configuration requirements means easier network administration and management, e.g. requires less support for application requiring mutiple CoS (e.g., Voice over IP data and signaling) need to be transported on a single path. It also facilitates easier per-customer end-to-end path debug.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 1:
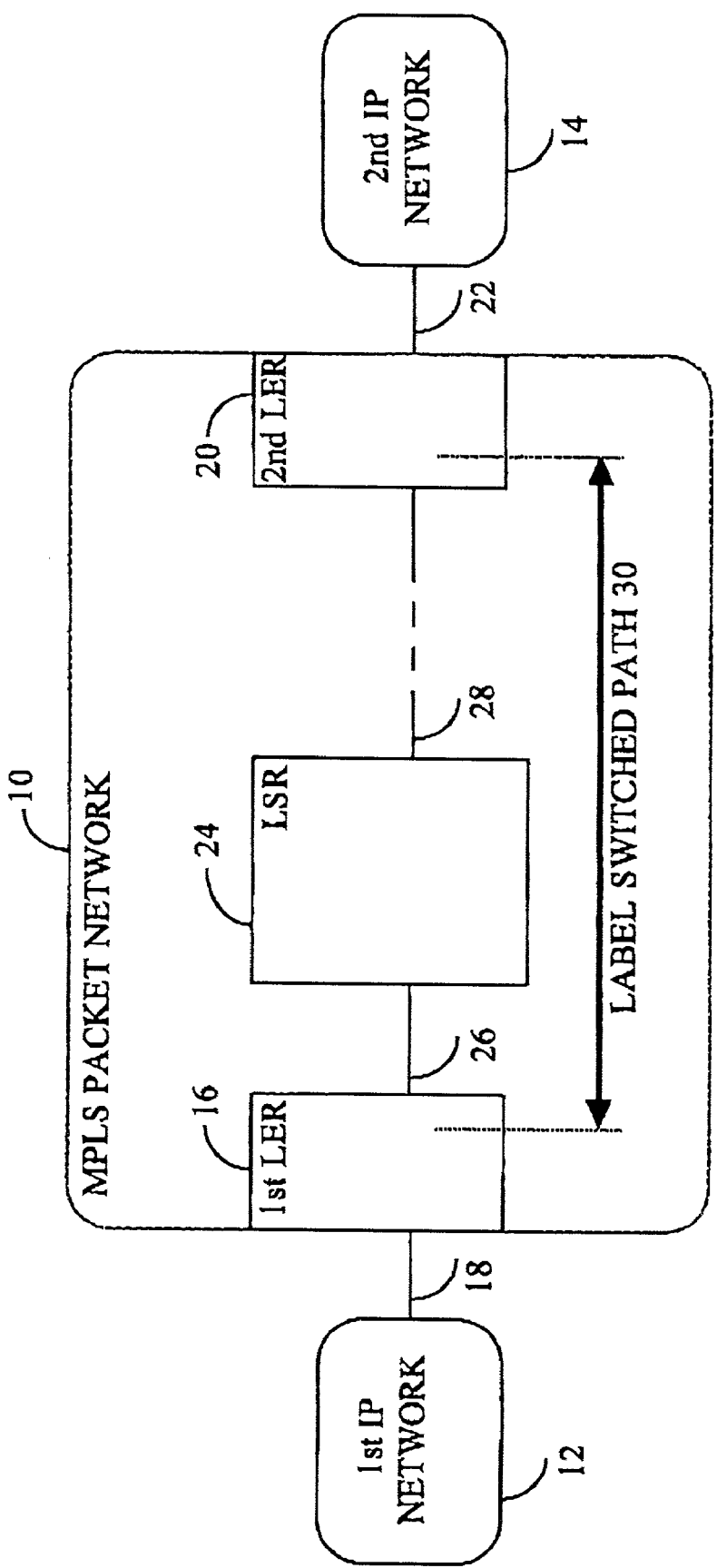
FIG. 1 shows an MPLS packet network of the prior art, interconnecting two IP networks.
Figure 2:
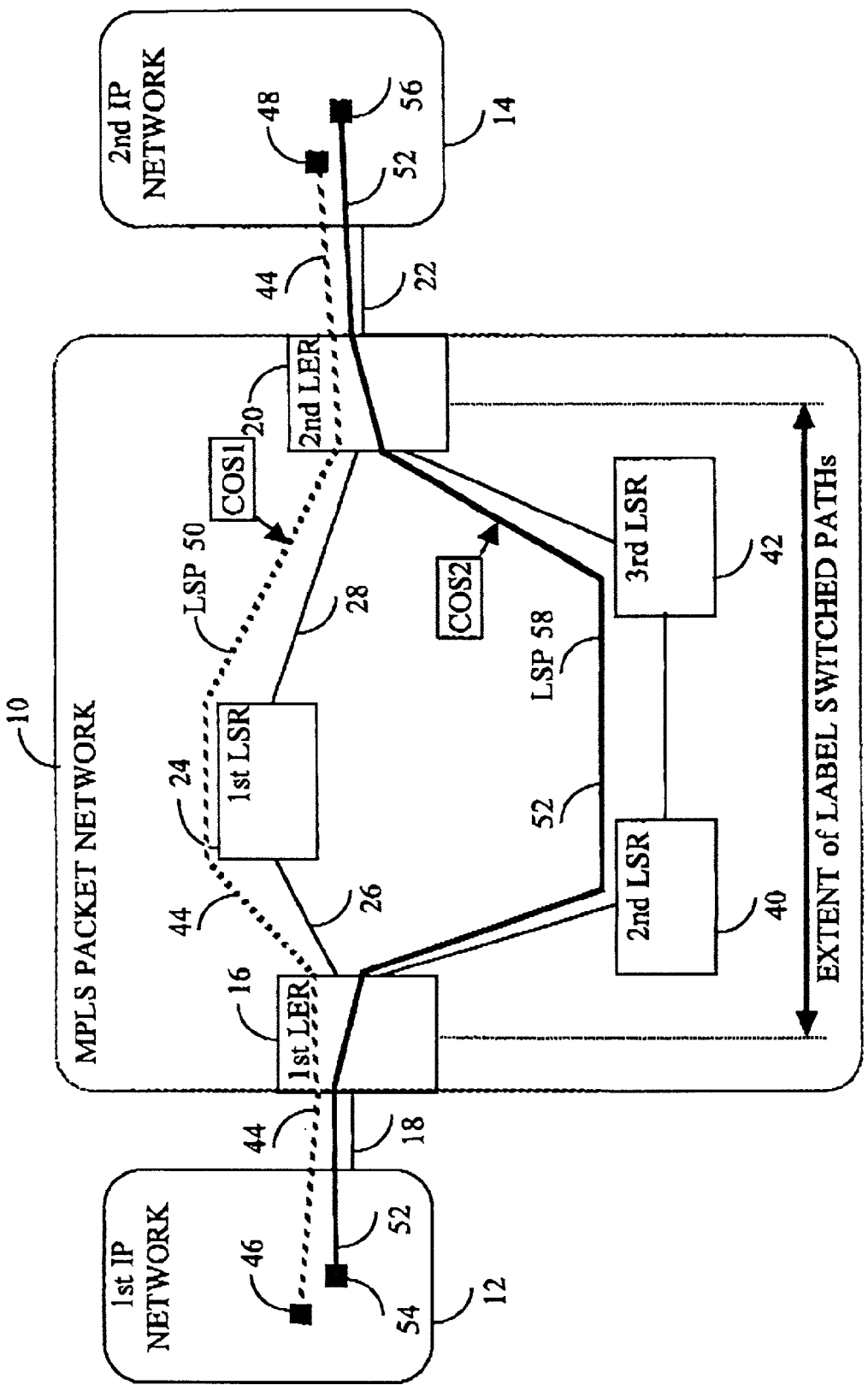
FIG. 2 shows the MPLS packet network of FIG. 1, and further illustrating the use of two LSPs for two classes of service.
Figure 3:
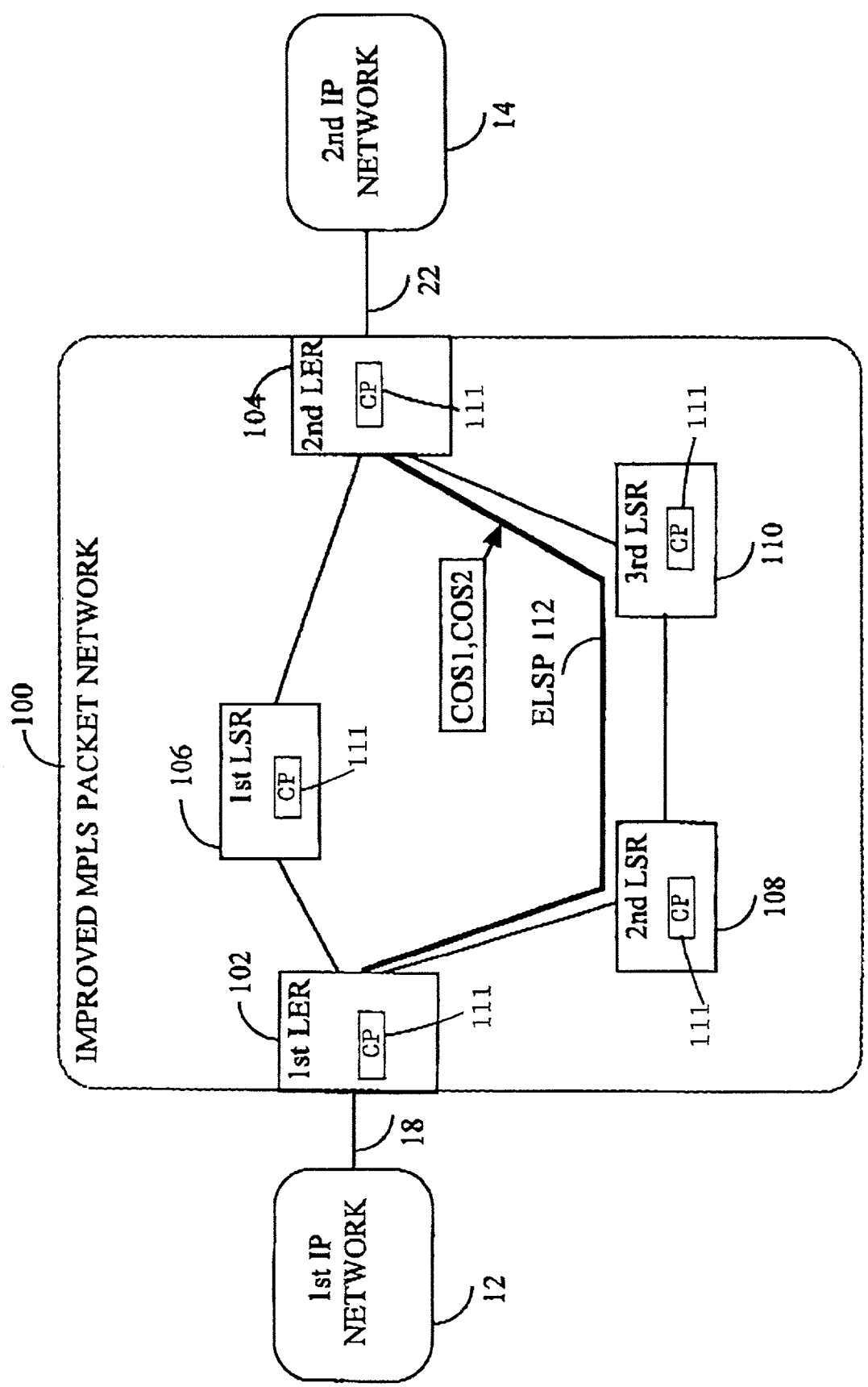
FIG. 3 shows an improved MPLS packet network according to the embodiments of the invention.

FIG. 3 illustrates an improved MPLS packet network 100 according to the invention. The MPLS packet network 100 includes first and second LERs 102 and 104, and first, second, and third LSRs 106, 108, and 110. Each of the LERs and LSRs has a control processor (CP) 111, which forms a computing means associated with a node, for signalling between the nodes in the MPLS network 100 in accordance with the label distribution protocol of the embodiments of the invention as will be described below. Also shown in FIG. 3 are two conventional IP networks 12 and 14.

The first IP network 12 is connected to the first LER 102 of the improved MPLS packet network 100 over link 18. The second IP network 14 is connected to the second LER 104 of the improved MPLS packet network 100 over link 22.

Within the improved MPLS packet network 100, the LERs 102 and 104 are connected with links to the LSRs 106, 108, and 110 as required to provide the physical connectivity.

Also shown in FIG. 3 is an enhanced label switched path 112 extending from LER 102 to LER 104, and passing through LSRs 108 and 110. This enhanced LSP 112 is similar to the conventional LSP 30, but enhanced to permit carriage of multiple classes of service as provided by CPs 111. Two classes of service, COS1 and COS2 are indicated in FIG. 3.

A number of modifications are required to permit an improved MPLS packet network to set up traffic engineered enhanced LSP that is capable of carrying traffic with multiple classes of service. These modifications include different areas of network architecture design affecting connection set-up (including Routing, Path Computation, Call Admission Control, and Signalling), and packet forwarding (including Buffer Management and Packet Marking). More information on packet forwarding can be found in Diffserv Architecture document i.e. DIFF_ARCH by Blake et al., "An architecture for Differentiated Services", RFC-2475, December 1998 Call Admission Control (CAC) and scheduling is widely discussed in connection oriented networks such as ATM networks and described, e.g., in N. Giroux, S. Ganti, "Quality of Service in ATM networks, State of the art traffic management", Prentice Hall, 1998.

An improved IGP routing protocol (e.g. OSPF) advertises per-link, per-class allocated (reserved) bandwidth. The per-class advertisements correspond to the Diffserv PHB Scheduling Classes. The OSPF extensions to achieve this can be found in Bitar N. et al, "Traffic Engineering Extensions to OSPF", Internet draft, <draft-bitar-rao-ospf-diffserv-mpls-01.txt>, July 2001. Unlike the previously mentioned scheme (the current DS-TE solution), in this document the priority levels are not used to imply per-class bandwidth usage. The resulting improvement is a more accurate reflection of link bandwidth availability by class, instead of the arbitrary mapping needed in the prior art solution.

An improved path computation algorithm attempts to find a path that satisfies multiple constraints, i.e it attempts to find a path that can satisfy the traffic parameters for each of the classes of service that will be carried over the single LSP. Since the network topology contains available bandwidth information on a per-class per-link basis, there is no need for any extra mapping or configuration. The improved path computation is described in a patent application to B. J. Lee, et al, "Multi-Constraint Routing System and Method", Ser. No. 10/025,869 filed Dec. 26, 2001.

An improved signaling protocol requests an LSP to be set up along the explicitly identified path and specifies multiple traffic parameters, each one corresponding to a particular Diffserv PHB Scheduling Class. At the same time, a single pre-emption priority level can be specified for the traffic traveling over this LSP. The pre-emption priority is defined in the current RSVP extensions for MPLS (RFC 3209).

The class and pre-emption priorities are independent. This decoupling allows the service provider to set the preemption level based on considerations other than class. It is not necessary to advertise the bandwidth utilized by the different priority levels. The RSVP-TE and CR-LDP protocols can be extended to signal per-class traffic profiles. These extensions are described in the next section.

An improved CAC algorithm maintains bandwidth usage per Diffserv PHB Scheduling Class and compares the LSP's requested traffic profiles against available bandwidth at each node as described, e.g., in the reference to N. Giroux, et al, cited above.

An improved packet forwarding method includes configuration of queuing and buffer management parameters on a per-Diffserv Scheduling Class basis, which directly correspond with the traffic parameters signaled in the LSP. This simplification allows dynamic modification of queueing and scheduling parameters as LSPs are setup. There is no need to maintain an additional configuration table mapping priority levels to forwarding plane scheduling classes.

Other forwarding functions, such as classification and policing functions can operate in a manner currently known in industry.

Signaling Extensions for the Improved MPLS Packet Network

The primary requirement to enable the support of differentiated services over a single label switched path in the improved traffic engineered MPLS packet network is the definition of new extensions for the MPLS signaling protocols.

New traffic engineering extensions are described for both the Resource ReServation Protocol (RSVP) Traffic Engineering Extension (TE) (RSVP-TE) and Constraint-based Label Distribution Protocol (CR-LDP) protocols.

RSVP-TE Extension

Please note that traffic profiles used in RSVP protocol terminology substantially correspond to traffic parameter(s) used in CR-LDP protocol terminology.

The current RSVP-TE protocol does not have a mechanism to specify the Diff-Serv PHB Scheduling class for an LSP. In addition, it supports only a single set of traffic profiles to be signaled per LSP, i.e. it is allowable to signal only a single TSPEC object.

An enhanced RSVP-TE signalling method is an extension to the current RSVP-TE protocol described in ietf drafts RFC 2205 and RFC 2210 and incorporated herein by reference. It allows the specification of multiple traffic profiles, and the specification of a Diff-Serv PHB Scheduling class for each set of traffic profiles as will be described in detail below.

Figure 4:
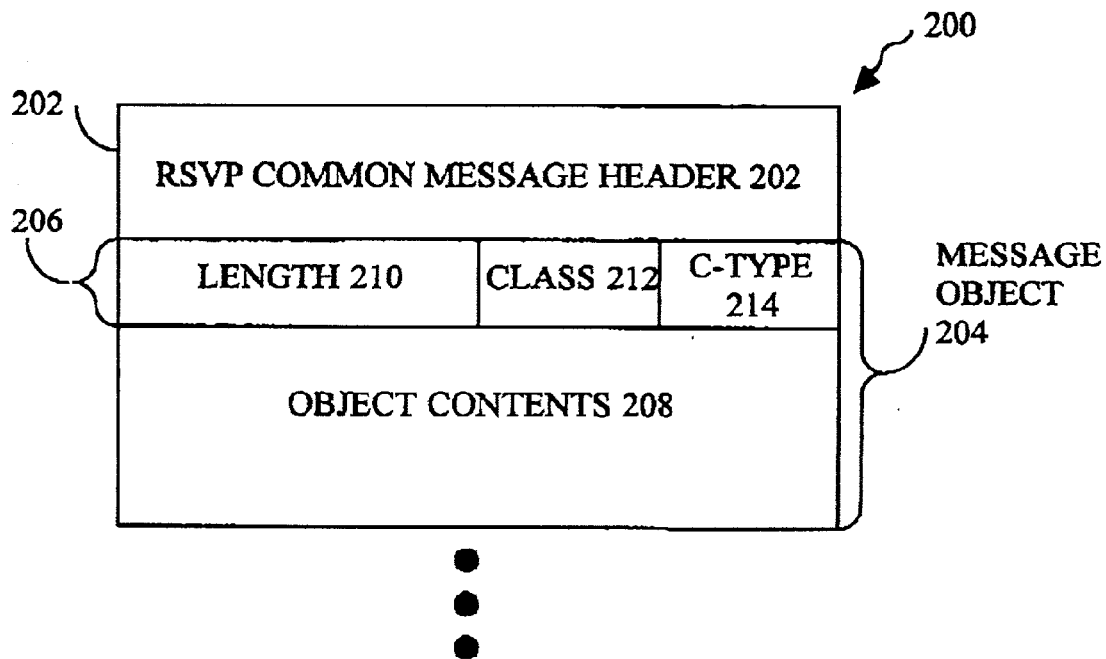
FIG. 4 shows an RSVP message of the prior art.

In FIG. 4 is illustrated the format of a standard RSVP message 200, see ietf draft RFC 2205. The RSVP message 200 contains a common message header 202 and one or more message objects 204. A message object is divided into a message object header 206 and the object contents 208. The format of the object header is common for all types of object, and contains three fields, a length 210, a class 212, and a message object type (C-type) 214. The length field 210 indicates the length of the object (number of octets), the class field 212 indicates the type of object (RFC 2205 specifies a number of object types for example STYLE and SESSION), the C-type field is a further identifier, specific to a class.

Figure 5:
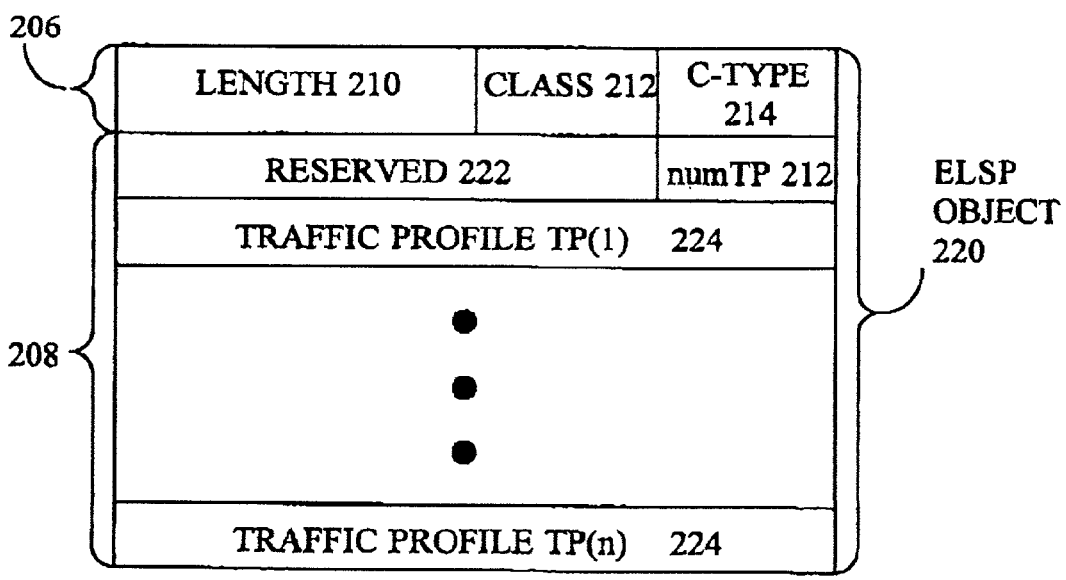
FIG. 5 shows an ELSP object to be used in an RSVP message of a first embodiment of the invention.

The set-up message object (ELSP object) 220 of a signalling message of the first embodiment is shown in FIG. 5. The object header of an ELSP object 220 follows the RSVP specification and contains the length 210 of the object, a class 212 which uniquely identifies the new ELSP object type, and a multi-class-of-service message object type 214 (C-type field 214) which should have a value of 127 or less in order to be processed correctly by the nodes processing an RSVP message containing an ELSP object 220. The value of the C-type field 214 ensures backwards compatibility with MPLS nodes that are not equipped to handle ELSP objects, and hence should reject the entire message.

The object multi-class-of-service set-up message contents 208 of an ELSP object 220 contains a reserved field 222 of 28 bits length, a numTP field 212 of 4 bits length, and a number of Traffic Profile (TP) fields 224, TP(1) to TP(n). The number "n" of the TP fields 224 is indicated by the value of the numTP field 212. This value can range from 0 to 8.

Figure 6:
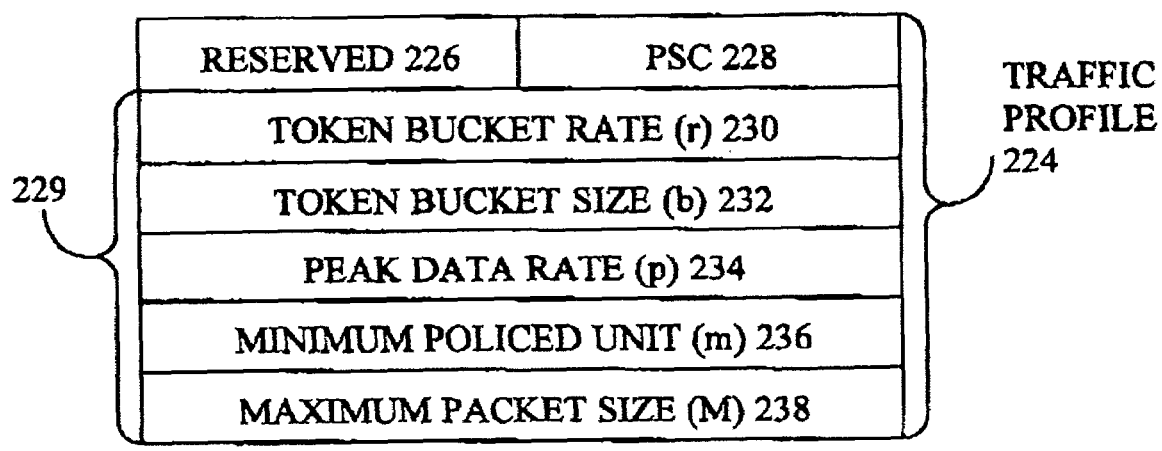
FIG. 6 shows the format of a traffic profile of the ELSP object of FIG. 5.

Each TP entry provides the traffic profile associated with a PSC (PHB Scheduling Class, PHB=Per-Hop-Behaviour) reservation for that ELSP object 220. The format of a Traffic Profile 224 is diagrammed in FIG. 6. It has a reserved field 226, a traffic profile sub-field (PSC identifier) 228 (in conformance with RFC 2836) identifying a PHB scheduling class associated with the corresponding class of service, and a number of traffic profile sub-fields 229, characterizing packet stream associated with the corresponding class of service, namely: a token bucket rate (r) 230, a token bucket size (b) 232, a peak data rate (p) 234, a minimum policed unit (m) 236, and a maximum packet size (M) 238. The PSC 228 field identifies the per-hop-behaviour scheduling class to which this traffic profile applies. The traffic parameters r, b, p, m, and M describe the dynamic behaviour of the traffic of the specified PSC for which this connection is being set up. RFC 2210 provides more info on the params: The parameters (r) and (b) should be set to reflect the contracted rate of traffic that will be sent over the LSP. Thus, the value (r) is equivalent to a committed information rate that the network assures it will deliver. The value (b) is the token bucket intended to reflect the maximum instantaneous traffic burst that a node can absorb while still considering the traffic as conformant. The peak rate (p) is another rate that can be signalled to reflect the sender's anticipated maximum rate of the traffic. Sometimes traffic between (r) and (p) is not dropped at the network edge but is marked with higher drop priority. Traffic in excess of (p) could be dropped at the network edge depending on the contracted policy. The minimum policed unit parameter (m) should generally be set equal the size of the smallest packet generated on the LSP. This packet size includes the application data and all protocol headers at or above the IP level (IP, TCP, UDP, RTP, etc.). The given size does not include any link-level headers, because these headers will change as the packet crosses different portions of the internetwork.

The format of the traffic profile is the same as specified for specifying Token Bucket parameters originally defined for RSVP, see section 3.1 of RFC 2210.

Returning to FIG. 5, it can be seen that a single ELSP object 220 is capable of carrying a set of up to 8 traffic profiles 224, each of which can apply to a different PHB Scheduling Class (PSC). This enables MPLS nodes involved in the RSVP call setup to accept or reject the call, using their CAC (Call Admission Control) mechanism, and to subsequently reserve the resources indicated for each PSC, in preparation for carrying traffic of any of the indicated PSCs over the same LSP.

CR-LDP Extension

CR-LDP described in RFC 3036 and RFC 3212 and incorporated herein by reference is an alternative label distribution protocol which may be used in MPLS packet networks.

In a second embodiment of the invention, it is extended to support the setup of differentiated services over a single label switched path in the improved MPLS packet network as will be described in detail below.

Figure 7:
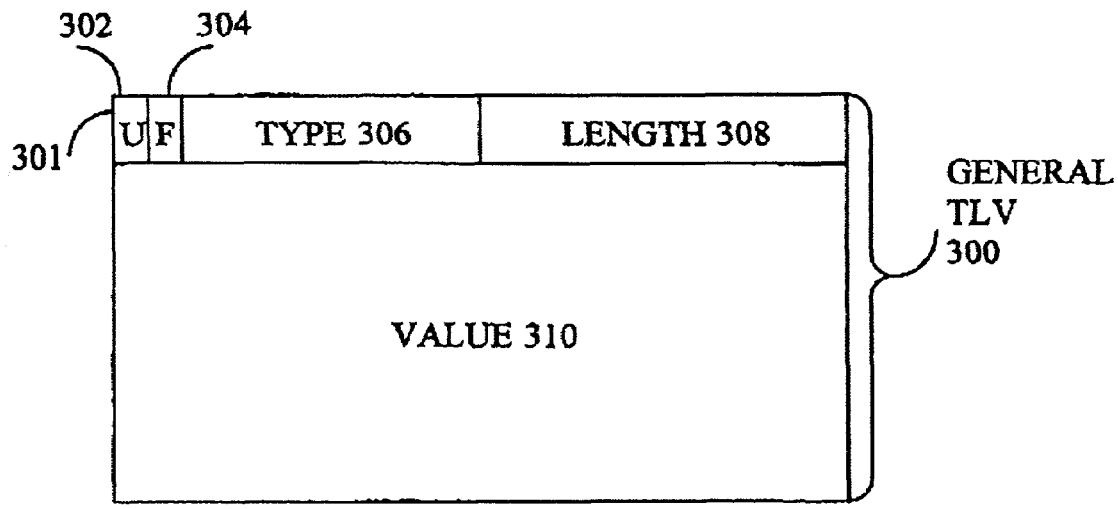
FIG. 7 shows a generic TLV object used in CR-LDP message of the prior art.

Traffic parameters are signalled in CR-LDP using set-up message objects, the set-up message objects being TLV (Type-Length-Value) objects 300. The TLV format, which describes the generic message object used in CR-LDP, is shown in FIG. 7. A TLV object 300 contains a common message header 301, having a U-bit sub-field 302, an F-bit sub-field 304, a 14-bit type sub-field field 306, and a 16-bit length field 308. The TLV object 300 also includes a variable length value field 310, which has the set-up message object contents. The usage of these fields in CR-LDP is described in detail in RFC 3036.

The terminology used in CR-LDP differs from that used in RSVP. A traffic specification (TSPEC in RSVP) is termed an "Ordered Aggregate" (OA) in CR-LDP. In the case of RSVP, the traffic specification is: SENDER_TSPEC for Path Message and FLOWSPEC for Resv Message. In case of CR-LDP, the traffic specification is "Traffic Parameters TLV".

An enhanced CR-LDP signalling method according to the second embodiment of the invention uses the current CR-LDP protocol and extends it to allow the specification of multiple explicit traffic parameters.

Figure 8:
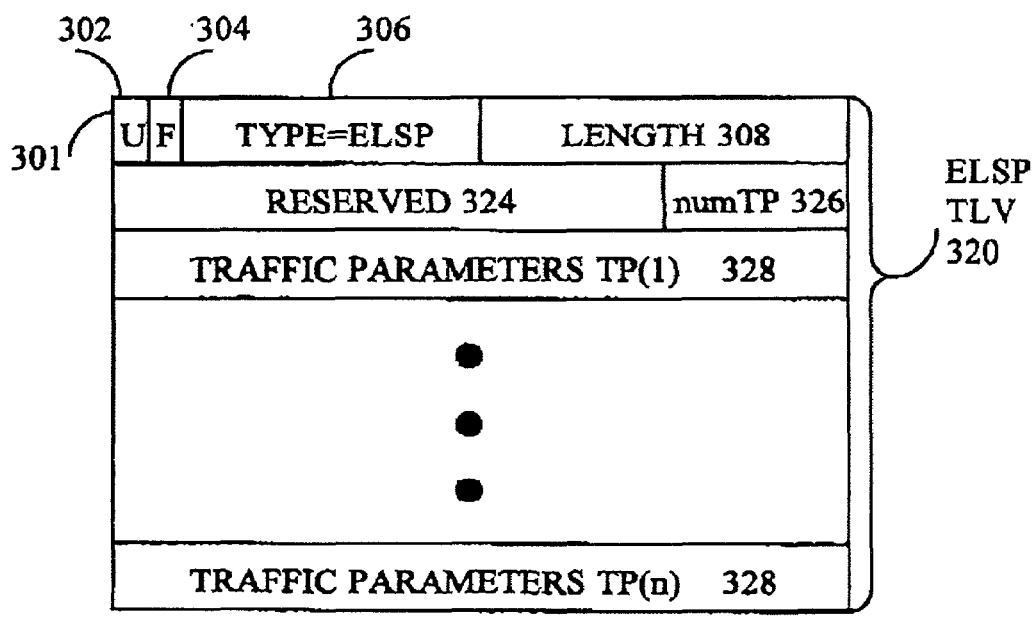
FIG. 8 shows an ELSP TLV object used in a CR-LDP message of a second embodiment of the invention.

In FIG. 8 is shown the format of the new ELSP TLV 320 of a set-up message object 300. It contains the same U, F, type, and Length sub-fields as the generic TLV format (FIG. 7), however the TYPE field 306 in FIG. 8 has a specific value to indicate a ELSP TLV. In place of the generic value field 310 (FIG. 7), the ELSP TLV contains a Reserved Field 324 of 18 bits, a numTP field of 4 bits for identifying the number of Classes of Service, and up to 8 Traffic Parameter fields 328 from TP(1) to TP(n). The value of the numTP field indicates the number of TP fields that follow.

Figure 9:
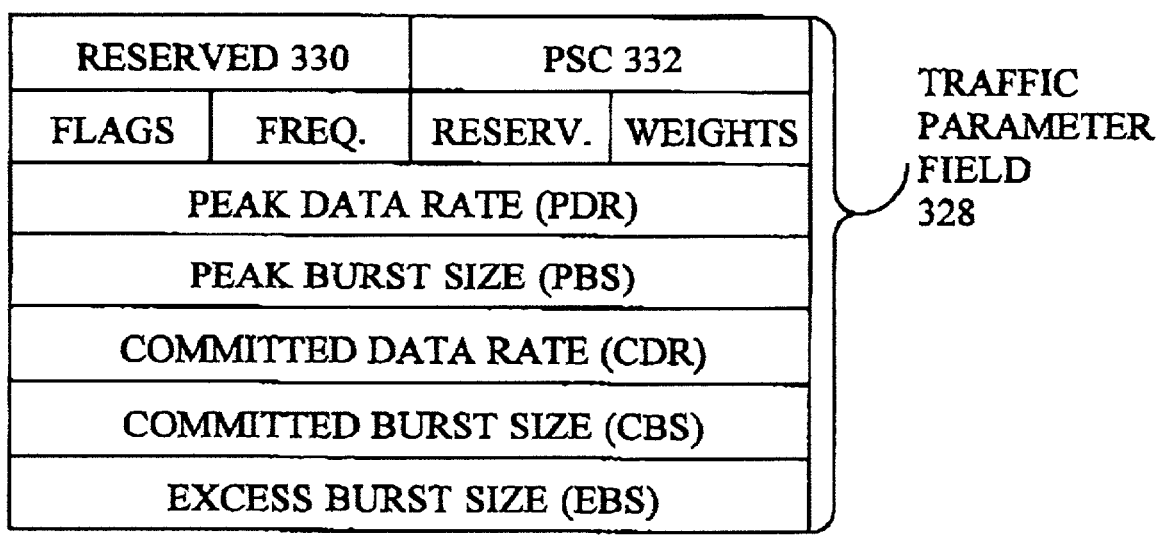
FIG. 9 shows the traffic parameter field of the ELSP TVL object of FIG. 8.

The format of the Traffic Parameter (TP) field is similar to the traffic parameters TLV of CR-LDP. Each TP entry provides the traffic parameters associated with a PSC (PHB Scheduling Class, PHB=Per-Hop-Behaviour) reservation for one ELSP object. The format of a Traffic Parameter field 328 is diagrammed in FIG. 9.

The Traffic Parameter field 328 contains a Reserved Field 330, a PHB scheduling class sub-field (PSC identifier) 332 (according to RFC 2836). The remaining sub-fields 329 are as specified in the CR-LDP definitions for the Traffic Parameter fields which can be found in Section 4.3 of RFC 3212. The traffic parameters describe the dynamic behaviour of the traffic of the specified PSC for which this connection is being set up and is used in the improved CAC (Connection Admission Control) calculations during setup, as well as to set the PHB (Per Hop Behaviour) parameters in each node of the LSP.

Although specific embodiments of the invention have been described in detail, it will be apparent to one skilled in the art that variations and modifications to the embodiments may be made within the scope of the following claims.

What is claimed is:

1. A method for signalling between nodes in an MPLS network comprising nodes, the method comprising the steps of:
   (i) generating signalling messages, each message comprising;
      a set-up message object comprising:
      a set-up message object header having a field for identifying a multi-class-of-service message object type; and
      a multi-class-of-service set-up message object contents, including:
      a field identifying the number of classes of service in the object contents, and
      a traffic profile field for each class of service; and
   (ii) exchanging the signalling messages between the network nodes.

2. The method as described in claim 1, the step (i) comprising generating the signalling message, wherein each of the traffic profile fields comprises a traffic profile sub-field identifying a Per-Hop-Behaviour (PHB) scheduling class associated with the corresponding class of service.

3. The method as described in claim 2, the step (i) comprising generating the signalling message, wherein each of the traffic profile fields further comprises sub-fields, characterizing a packet stream associated with the corresponding class of service.

4. The method as described in claim 3, the step (i) comprising generating the signalling message, wherein the number of sub-fields, characterizing a packet stream associated with the corresponding class of service is equal to five.

5. The method as described in claim 4, the step (i) comprising generating the signalling message, wherein the five sub-fields, characterizing the packet stream are the Token Bucket parameters used in Resource ReServation Protocol traffic engineering extension (RSVP-TE).

6. The method as described in claim 4, the step (i) comprising generating the signalling message, wherein the five sub-fields, characterizing the packet stream are the fields used in traffic parameter fields in constraint based label distribution protocol (CR-LDP).

7. The method as described in claim 3, the step (i) comprising generating the signalling message, wherein the sub-fields, characterizing the packet stream are the fields used in traffic parameter fields in CR-LDP.

8. The method as described in claim 1, the method being used for establishing a label switched path in the MPLS network.

9. A method for establishing a label switched path (LSP) to carry traffic of more than one class of service on the same LSP in an MPLS network having a plurality of nodes connected by links, the method comprising the steps of:
   exchanging signalling messages between the network nodes according to the method of claim 1;
   keeping track of per-class available resources on each link and advertising them to the rest of the network;
   computing a path for a call request taking into account the available resources and traffic profile of the object contents of the multi-class-of-service set-up message; and providing call admission control (CAC).

10. A method for packet forwarding at a link in an MPLS network comprising nodes, the method comprising the steps of:
   (a) in each node, associating a packet with a Per-Hop-Behaviour (PHB) scheduling class, defined in a label distribution protocol for signalling between the nodes, for the label switched path of the packet, the label distribution protocol comprising a message including:

a set-up message object, comprising;

a set-up message object header having a field for identifying a multi-class-of-service message object type; and a multi-class-of-service set-up message object contents, including;

a field identifying the number of classes of service in the object contents, and a traffic profile field for each class of service;

wherein each of the traffic profile fields comprises a traffic profile sub-field identifying the Per-Hop-Behaviour (PHB) scheduling class associated with the corresponding class of service; and (b) adjusting PHB scheduling and buffer management parameters according to a per-class resource usage of the link defined in the step (a).

11. A method for packet forwarding in an MPLS network comprising nodes, the method comprising the steps of:

(a) in each edge node (LER), associating a packet with the traffic profile, defined in a label distribution protocol for signalling between the nodes, for the label switched path of the packet, the label distribution protocol comprising a message including;

a set-up message object, comprising:

a set-up message object header having a field for identifying a multi-class-of-service message object type; and a multi-class-of-service set-up message object contents, including;

a field identifying the number of classes of service in the object contents, and a traffic profile field for each class of service; and (b) selecting policing parameters for each class of the LSP at the edge (LER) node according to the traffic profile defined in the step (a).

12. An MPLS network comprising nodes, each node having a control processor, comprising:

(i) means for generating signalling messages, each message comprising:

a set-up message object, comprising:

a set-up message object header having a field for identifying a multi-class-of-service message object type; and a multi-class-of-service set-up message object contents, including:

a field identifying the number of classes of service in the object contents, and a traffic profile field for each class of service; and (ii) means for exchanging the signalling messages between the network nodes.

* * * * *

UNITED STATES PATENT AND TRADEMARK OFFICE
CERTIFICATE OF CORRECTION

PATENT NO.         : 7,184,434 B2
APPLICATION NO. : 10/107333
DATED              : February 27, 2007
INVENTOR(S)        : S. Ganti et al.

It is certified that error appears in the above-identified patent and that said Letters Patent is hereby corrected as shown below:

Column 13, line 3, "comprising;" is corrected to read as --comprising:--

Column 13, line 25, "including;" is corrected to read as --including:--

Column 14, line 2, "including;" is corrected to read as --including:--

Signed and Sealed this

Fifteenth Day of July, 2008

JON W. DUDAS
*Director of the United States Patent and Trademark Office*